(12) United States Patent
Hanel et al.

(10) Patent No.: US 9,950,391 B2
(45) Date of Patent: Apr. 24, 2018

(54) WELDING SYSTEM FOR VEHICLE BODY COMPONENTS

(71) Applicant: FORD GLOBAL TECHNOLOGIES, LLC, Dearborn, MI (US)

(72) Inventors: Tamara Hanel, Royal Oak, MI (US); Arnon Wexler, Bloomfield Hills, MI (US); Peter Busuttil, Troy, MI (US); Neil Greig, Auburn Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 425 days.

(21) Appl. No.: 14/877,404

(22) Filed: Oct. 7, 2015

(65) Prior Publication Data

US 2017/0100799 A1  Apr. 13, 2017

(51) Int. Cl.
*B23K 26/24* (2014.01)
*B23K 26/32* (2014.01)
*B62D 65/02* (2006.01)
*B25B 11/02* (2006.01)
*B23Q 1/25* (2006.01)
*B23K 101/00* (2006.01)

(52) U.S. Cl.
CPC .............. *B23K 26/24* (2013.01); *B23K 26/32* (2013.01); *B23K 2201/006* (2013.01); *B62D 65/024* (2013.01)

(58) Field of Classification Search
CPC ...... B23K 26/24; B23K 26/32; B62D 27/023; B62D 65/02; B25B 11/02; B23Q 1/25
USPC .................... 219/121.63, 121.82; 269/55, 58
See application file for complete search history.

(56) References Cited

U.S. PATENT DOCUMENTS

| | | | |
|---|---|---|---|
| 2,301,636 A * | 11/1942 | Nicol | B62D 65/02 269/296 |
| 6,539,765 B2 | 4/2003 | Gates | |
| 7,377,581 B2 | 5/2008 | Barutzky et al. | |
| 8,636,197 B1 | 1/2014 | Hill et al. | |
| 8,950,647 B2 * | 2/2015 | Magnano | B23K 37/0408 228/43 |
| 2006/0179628 A1 * | 8/2006 | Sturm | B23K 37/0443 29/33 P |
| 2013/0113148 A1 * | 5/2013 | Jang | B62D 65/18 269/58 |

* cited by examiner

*Primary Examiner* — Samuel M Heinrich
(74) *Attorney, Agent, or Firm* — Jason Rogers; Brooks Kushman P.C.

(57) ABSTRACT

A welding system is provided. The welding system includes a fixture, a plurality of pressure blocks, and a laser welder. The fixture is configured to grasp a roof panel and transition to an advanced position in order to align the roof panel with a roof rail along a weld line. The plurality of pressure blocks are movably secured to the fixture such that advancing the pressure blocks when the fixture is in the advanced position provides a compression force between the roof panel and roof rail along the weld line to prevent distortion during a welding operation. The laser welder is configured to weld the roof panel to the roof rail along the weld line.

20 Claims, 3 Drawing Sheets

WELDING SYSTEM FOR VEHICLE BODY COMPONENTS

TECHNICAL FIELD

The present disclosure relates to systems for welding vehicular body and frame structures.

BACKGROUND

Aluminum alloys inherently have high thermal conductivity properties (nearly 3.5 times that of steel). Heating aluminum during a manufacturing process, therefore, may result in an uncontrolled expansion of components that are made from aluminum. This uncontrolled expansion of aluminum components may lead to distortions causing the aluminum components to exceed dimensional tolerances.

SUMMARY

A welding system is provided. The welding system includes a fixture, a plurality of pressure blocks, and a laser welder. The fixture is configured to grasp a roof panel and transition to an advanced position in order to align the roof panel with a roof rail along a weld line. The plurality of pressure blocks are movably secured to the fixture such that advancing the pressure blocks when the fixture is in the advanced position provides a compression force between the roof panel and roof rail along the weld line to prevent distortion during a welding operation. The laser welder is configured to weld the roof panel to the roof rail along the weld line.

A fixture for aligning a roof panel relative to a roof rail is provided. The fixture includes a frame, an array of suction cups, and a plurality of pressure blocks. The array of suction cups is secured to the frame and is configured to grasp the roof panel. The plurality of pressure blocks are movably secured to the frame and are configured to contact the roof panel and provide a compression between the roof panel and roof rail along a weld line to prevent distortion when welding the roof panel to the roof rail.

A welding system is provided. The welding system includes a fixture, pressure blocks, and a laser welder. The fixture is configured to align first and second aluminum sheet metal components along a weld line. The pressure blocks are movably secured to the fixture and are configured to advance and engage the first component adjacent to the weld line such that a compressive force between the first and second components prevents distortion during welding operations. The laser welder is configured to weld the first component to the second component along the weld line.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
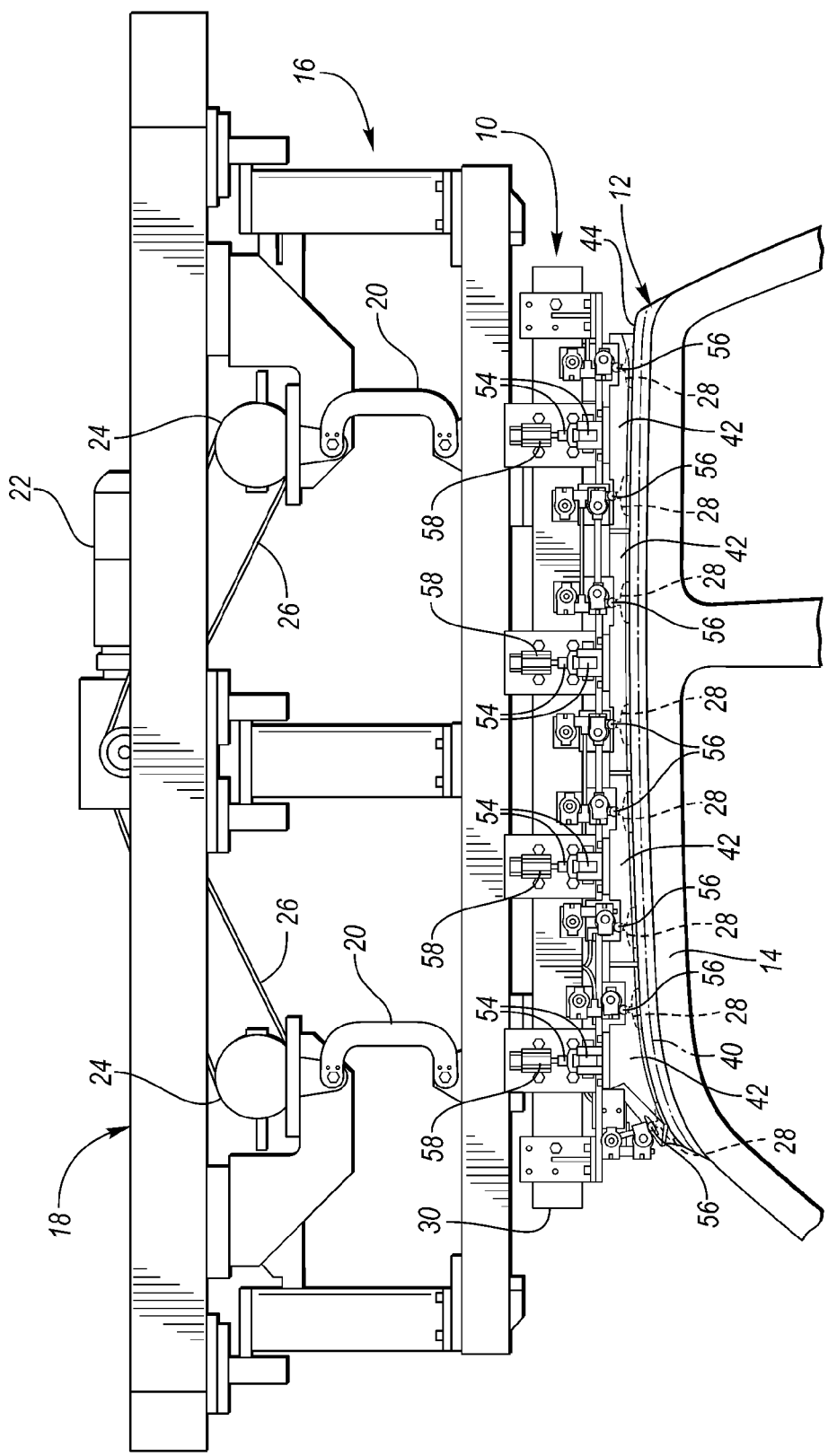
FIG. 1 is a side view of a fixture configured to align mating components during a welding operation.
Figure 2:
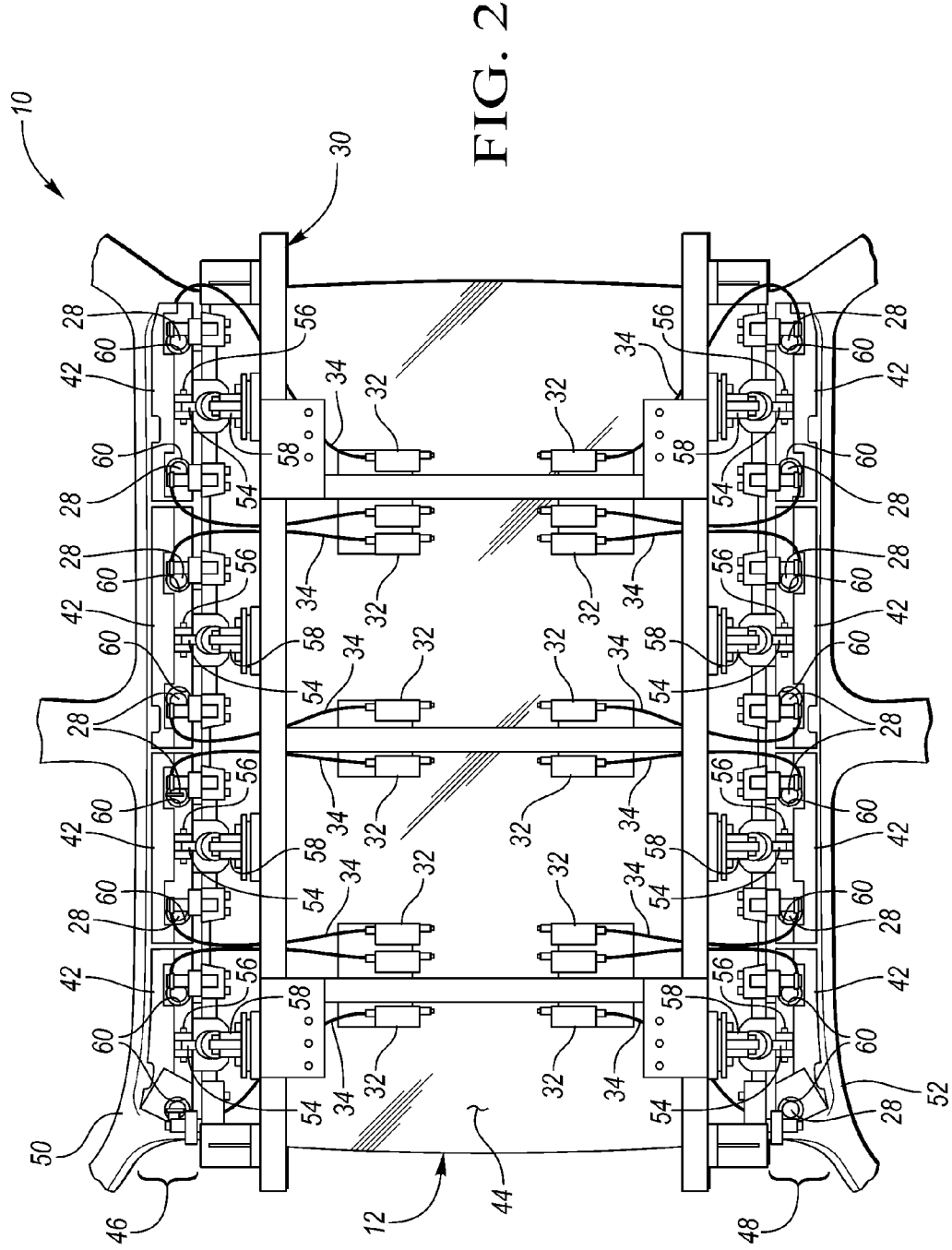
FIG. 2 is a top view of the fixture.

Referring to FIGS. 1 and 2, a fixture 10 is illustrated for aligning first and second sheet metal components during a welding operation, along a weld line. The sheet metal components may be made from any type of sheet metal including, but not limited to, steel, magnesium, magnesium alloys, aluminum, or aluminum alloys. For example, the first and second sheet metal components may be a roof panel 12 and a roof rail 14 of a vehicle body. The roof rail 14 may be the upper portion of a body side panel of the vehicle body. The body side panel may include an A-pillar, B-pillar, or C pillar that may be attached to the roof rail. The fixture 10 may be secured to a lowering device 16. The lowering device 16 is shown in in FIG. 1.

The lowering device 16 may include a frame 18. At least one pivoting arm 20 may connect the fixture 10 to the frame 18 of the lowering device 16. The pivoting arms 20 may be connected to a power source 22 (such as electric motor) in order to rotate the pivoting arms 20 such that the fixture 10 moves between a raised (or retracted) position to a lowered (or advanced) position. The pivoting arms 20 may be connected to the power source 22 by a series of pulleys 24 and belts 26. The disclosure, however, should not be construed as limited to the lowering device 16 described herein but should include any type of mechanism that is capable of moving the fixture 10 between a raised (or retracted) position and a lowered (or advanced) position. For example, movement of the fixture 10 between the raised and lowered positions may be powered by electrical solenoids, hydraulic cylinders, pneumatic cylinders, etc. and guided by ball screws, bearing blocks that move about guide rails, etc.

A plurality or array of suction cups 28 may be secured to a frame 30 of the fixture 10 and configured to grasp the roof panel 12 to secure the roof panel 12 to the fixture 10. The fixture 10 is configured to align the roof panel 12 and the roof rail 14 when the roof panel 12 is secured to the fixture 10, the roof rail 14 is located beneath the fixture 10, and the fixture 10 is in the lowered position. The suction cups 28 may be configured to grasp the roof panel 12 by generating a vacuum between the suction cups 28 and the roof panel 12. A series of vacuum generators 32 (which may be valves connected to a vacuum source) may be connected to the suction cups by series of vacuum lines 34 in order to provide the vacuum between the suction cups 28 and the roof panel 12. The vacuum generators 32 may be secured to the frame 30 of the fixture 10. The suction cups 28 may be movably secured to the frame 30 of the fixture 10. For example, the suction cups 28 may be connected to the frame 30 by a ball joint 36 to allow the suction cups 28 to pivot in any direction relative to the roof panel 12 to ensure proper alignment between the suctions cups 28 and the roof panel 12 when the suction cups 28 are grasping the roof panel 12.

A plurality of pressure blocks 42 are secured to the frame 30 of the fixture 10 and are configured to provide a compression force between the roof panel 12 and roof rail 14 along a contour of a weld line 40. The compression force between the roof panel 12 and roof rail 14 prevents distortion of either the roof panel 12 or roof rail 14 during a welding operation. The welding operation may join the roof panel 12 to the roof rail 14 by a continuous or stitch weld. The plurality of pressure blocks 42 are configured to contact the roof panel 12 and conform to a contour of the roof panel 12 that is adjacent to the contour of the weld line 40. The contour of the roof panel 12, where the plurality of pressure blocks 42 come into contact with the roof panel 12, may parallel the contour of the weld line 40. The plurality of pressure blocks 42 may be configured to contact the top surface 44 of the roof panel 12. The pressure blocks 42 may also define apertures 60 for receiving the plurality of suction cups 28.

The plurality of pressure blocks 42 may include a first bank 46 of pressure blocks 42 configured to provide a compression force between the roof panel 12 and a right side roof rail 50 in order to prevent distortion during a welding operation. The plurality of pressure blocks 42 may also include a second bank 48 of pressure blocks 42 configured to provide a compression force between the roof panel 12 and a left side roof rail 52 in order to prevent distortion during a welding operation.

The pressure blocks 42 may be movably secured to the fixture 10 such that a downward movement of the pressure blocks 42 increases the compression force between the roof panel 12 and roof rail 14. Specifically, the pressure blocks 42 may transition from a raised (or retracted) position to a lowered (or advanced) position in order to provide the compression force between the roof panel 12 and the roof rail 14. The pressure blocks 42 may be movably secured to the fixture 10 by series of links (or linking arms) 54 and pivots 56. Alternatively, the pressure blocks 42 may be movably secured to the fixture 10 by ball screws, bearing blocks that move about guide rails, or any other mechanism capable of moving the pressure blocks 42 between retracted and advanced positions.

A plurality of pneumatic cylinders 58 may connect the pressure blocks 42 to the frame 30 of the fixture 10 (directly or via the links 54 and pivots 56) such that activation of the pneumatic cylinders 58 advances (or generates a downward movement) of the pressure blocks 42 to increase the compression force between the roof panel 12 and roof rail 14. In the embodiment depicted in the Figures, the shafts of pneumatic cylinders 58 connect to a first link (or linking arm), the first link connects to a second link (or linking arm) by a pivot (or pin that allows the links to pivot relative to each other), and the second link is connects to a pressure block 42 by a pivot. The second link may be pivotally connected to the pressure block by a bracket or yoke. It should be understood, however, that other configurations of links and pivots may connect the pressure blocks 42 to the frame 30 of the fixture 10. Alternatively, other devices such as electrical solenoids, hydraulic cylinders, or any other device capable of advancing the pressure blocks 42 to increase the compression force between the roof panel 12 and roof rail 14 may be used.

Figure 3:
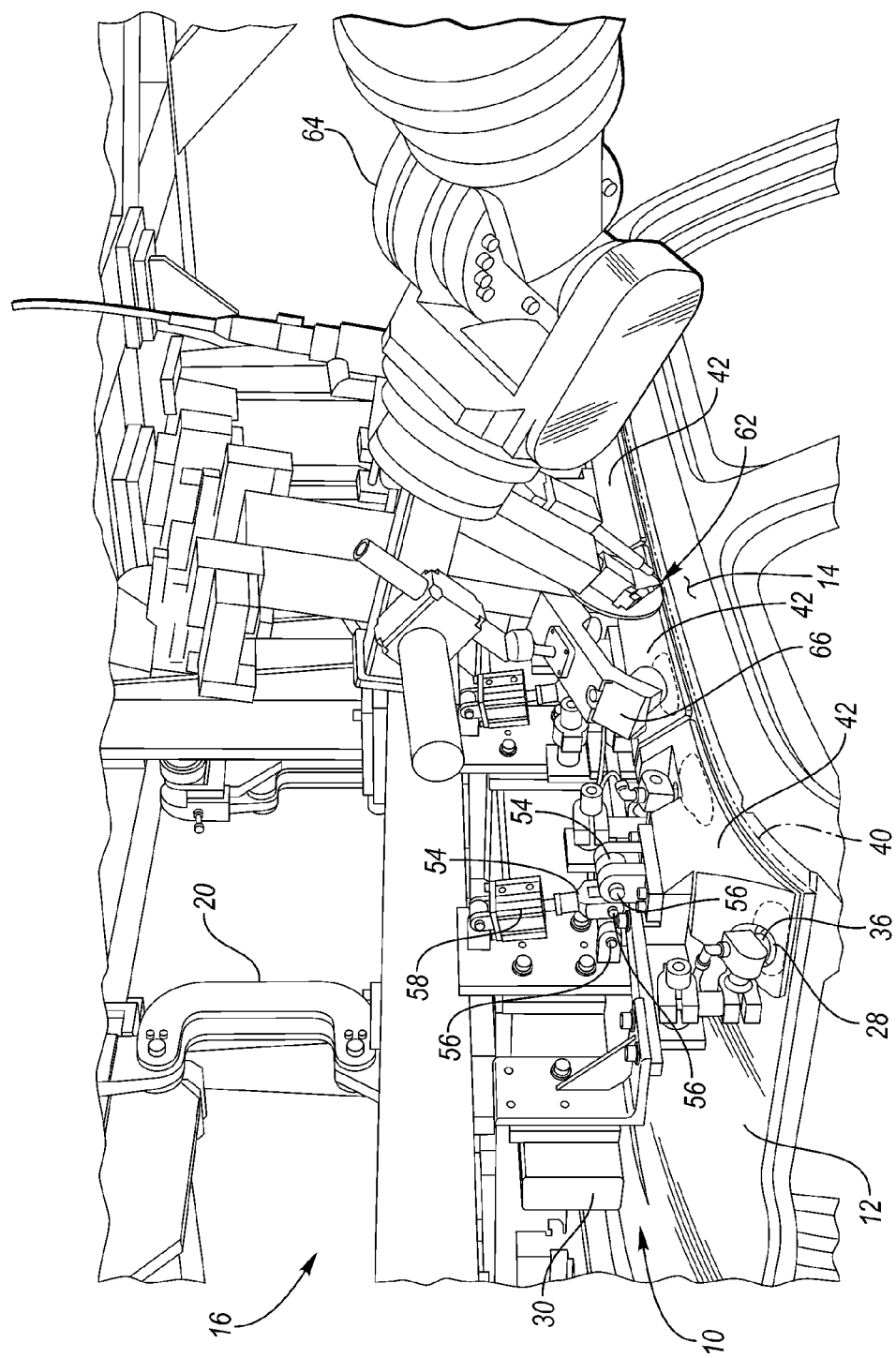
FIG. 3 is an isometric view of the fixture and a welder secured to a robotic arm performing a welding operation.

Referring to FIG. 3, an isometric view of a welding system that includes the fixture 10, the lowering device 16, and a welder 62 performing a welding operation is illustrated. The welder 62 may be configured to weld the roof panel 12 to the roof rail 14 along the weld line 40. The welder 62 may be any type of welder known in the art, but is preferably a laser welder. The welder 62 may be secured to a robotic arm 64. The robotic arm 64 may be configured to guide the welder 62 along the weld line 40. A camera 66 may be secured to the robotic arm 64 to ensure that the robotic arm 64 guides the welder along the weld line 40 between the roof panel 12 and the roof rail 14. The camera 66 communicates with a controller. The controller recognizes the weld line 40 to guide robotic arm 64 along the correct path (i.e., the weld line 40). The controller may also be configured to initiate a welding operation when the roof panel 12 and roof rail 14 are aligned. The fixture 10 may include sensors that communicate with the controller. The sensors may generate inputs to the controller based on the presence of the roof panel 12, the presence of roof rail 14, whether the vacuum generators 32 have been activated, whether the fixture 10 is in the lowered position, etc. The controller may include algorithms that are configured to initiate the welding operation based on inputs from sensors.

The controller may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:
1. A welding system comprising:
   a fixture configured to grasp a roof panel and transition to an advanced position in order to align the roof panel with a roof rail along a weld line;
   a plurality of pressure blocks movably secured to the fixture such that advancing the pressure blocks when the fixture is in the advanced position provides a compression force between the roof panel and roof rail along the weld line to prevent distortion during a welding operation; and
   a laser welder configured to weld the roof panel to the roof rail along the weld line.

2. The welding system of claim 1, wherein the plurality of pressure blocks contacts a top surface of the roof panel when advanced.

3. The welding system of claim 2, wherein the pressure blocks are moveably secured to the fixture such that a downward movement of the pressure blocks increases the compression force between the roof panel and roof rail.

4. The welding system of claim 3, wherein a plurality of pneumatic cylinders are connected to the fixture and the pressure blocks such that activation of the pneumatic cylinders generates a downward movement of the pressure blocks to increase the compression force between the roof panel and roof rail.

5. The welding system of claim 2, wherein a plurality of suction cups secured to the fixture are configured to grasp the roof panel in order to secure the roof panel to the fixture.

6. The welding system of claim 5, wherein the pressure blocks define apertures and the suctions cups are disposed within the apertures.

7. The welding system of claim 1, wherein the roof panel and the roof rail are aluminum.

8. The welding system of claim 1, wherein the laser welder is secured to a robotic arm that is configured to guide the laser welder along the weld line.

9. A fixture for aligning a roof panel relative to a roof rail comprising:
   a frame;
   an array of suction cups secured to the frame and configured to grasp the roof panel; and
   a plurality of pressure blocks movably secured to the frame and configured to contact the roof panel to provide compression between the roof panel and roof rail along a weld line to prevent distortion when welding the roof panel to the roof rail.

10. The fixture of claim 9, wherein the plurality of pressure blocks are configured to advance and contact a top surface of the roof panel adjacent and parallel to a contour of the weld line during a welding operation.

11. The fixture of claim 10, wherein the pressure blocks are moveably secured to the frame such that a downward movement of the pressure blocks increases the compression between the roof panel and roof rail.

12. The fixture of claim 11, wherein a plurality of pneumatic cylinders are connected to the frame and the pressure blocks such that activation of the pneumatic cylinders generates a downward movement of the pressure blocks to increase the compression between the roof panel and roof rail.

13. The fixture of claim 10, wherein the pressure blocks define apertures and the suction cups are disposed within the apertures.

14. The fixture of claim 9, wherein the suction cups grasp the roof panel via a vacuum generated between the suctions cups and the roof panel.

15. The fixture of claim 9, wherein the suctions cups are pivotally secured to the frame.

16. The fixture of claim 9, wherein the roof panel and the roof rail are aluminum.

17. A welding system comprising:
   a fixture configured to align first and second aluminum sheet metal components along a weld line;
   pressure blocks movably secured to the fixture and configured to advance and engage the first component adjacent to the weld line such that a compressive force between the first and second components prevents distortion during welding operations; and
   a laser welder configured to weld the first component to the second component along the weld line.

18. The welding system of claim 17, wherein the pressure blocks contact a top surface of the first component when advanced.

19. The welding system of claim 18, wherein the pressure blocks are moveably secured to the fixture such that a downward movement of the pressure blocks increases the compression force between the first and second components, and wherein a plurality of pneumatic cylinders are connected to the fixture and the pressure blocks such that activation of the pneumatic cylinders generates the downward movement of the pressure blocks to increase the compression force between the first and second components.

20. The welding system of claim 17, wherein a plurality of suction cups secured to the fixture are configured to grasp the first component in order to secure the first component to the fixture.

* * * * *